(12) United States Patent
Line et al.

(10) Patent No.: US 11,214,173 B2
(45) Date of Patent: Jan. 4, 2022

(54) VEHICLE SEATING ASSEMBLY

(71) Applicant: Ford Global Technologies, LLC, Dearborn, MI (US)

(72) Inventors: Johnathan Andrew Line, Northville, MI (US); Joseph Michael Kish, Canton, MI (US); Daniel Ferretti, Commerce Township, MI (US); Spencer Robert Hoernke, Dundas (CA); Marcos Silva Kondrad, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 301 days.

(21) Appl. No.: 16/352,220

(22) Filed: Mar. 13, 2019

(65) Prior Publication Data
US 2020/0290484 A1    Sep. 17, 2020

(51) Int. Cl.
*B60N 2/02* (2006.01)
*B60N 2/015* (2006.01)
*B60N 2/14* (2006.01)
*B60N 2/06* (2006.01)
*B60N 2/20* (2006.01)

(52) U.S. Cl.
CPC ........... *B60N 2/0244* (2013.01); *B60N 2/015* (2013.01); *B60N 2/06* (2013.01); *B60N 2/143* (2013.01); *B60N 2/20* (2013.01); *B60N 2002/0264* (2013.01)

(58) Field of Classification Search
CPC ........ B60N 2/0244; B60N 2/015; B60N 2/06; B60N 2/143; B60N 2/20

USPC .................... 296/63, 64, 65.01, 65.15, 65.13
See application file for complete search history.

(56) References Cited

U.S. PATENT DOCUMENTS

| | | | |
|---|---|---|---|
| 3,603,638 A | 9/1971 | McGregor et al. | |
| 4,341,415 A | 7/1982 | Braun et al. | |
| 5,018,696 A * | 5/1991 | Siegrist ............... | B60N 2/0232 248/429 |
| 5,240,310 A | 8/1993 | Rink | |
| 5,468,050 A * | 11/1995 | Hall ........................ | B60N 2/00 297/344.1 |
| 5,636,884 A | 6/1997 | Ladetto et al. | |
| 5,720,463 A * | 2/1998 | Wisner ..................... | B60N 2/06 248/429 |
| 6,336,619 B1 | 1/2002 | Wahls | |
| 6,559,392 B1 | 5/2003 | Haynes et al. | |
| 6,595,586 B2 | 7/2003 | Brightbill et al. | |
| 6,869,132 B2 | 3/2005 | Wang et al. | |
| 2007/0085375 A1* | 4/2007 | Terada ................. | H02G 11/006 296/155 |
| 2015/0375638 A1* | 12/2015 | Farooq ................. | B60N 2/0715 297/344.12 |
| 2021/0206303 A1* | 7/2021 | Petit ....................... | B60N 2/067 |

* cited by examiner

*Primary Examiner* — Hilary L Gutman
(74) *Attorney, Agent, or Firm* — David Coppiellie; Price Heneveld LLP

(57) ABSTRACT

A vehicle seating assembly is provided that includes a platform. The platform includes a frame having an attachment feature. A seat base is coupled with the attachment feature. A cross-member is coupled to the frame and movable between extended and retracted positions. The seating assembly also includes a track assembly including a plurality of tracks received by guides. The platform extends between each of the plurality of tracks.

18 Claims, 10 Drawing Sheets

US 11,214,173 B2

VEHICLE SEATING ASSEMBLY

FIELD OF THE DISCLOSURE

The present disclosure generally relates to a vehicle seating assembly, and more specifically to a vehicle seating assembly movable between multiple positions.

BACKGROUND OF THE DISCLOSURE

Vehicle seats often need to be moved into various positions within a vehicle. To achieve movement of the vehicle seats, various attachments and track assemblies may be used. Vehicle seats having various dimensions may also be used to achieve efficient use of space and user-friendly movement.

SUMMARY OF THE DISCLOSURE

According to one aspect of the present disclosure, a vehicle may be provided that includes a seating assembly. The seating assembly includes a seatback pivotally coupled to a seat base. A floor panel defines a channel having a first sidewall and a second sidewall. The first and second sidewalls frame a void. A track assembly has first and second C-channels coupled to the first and second sidewalls. The first and second tracks are received by the first and second C-channels, respectively. The first and second tracks are coupled with an electrical assembly. A platform is positioned beneath the seating assembly and is at least partially received by the void. The platform includes a frame. The frame has an attachment feature extending away from the floor. A cross-member is extendable between first and second positions. The cross-member is at least partially supported by the frame.

Embodiments of the first aspect of the disclosure may include any one or a combination of the following features:
the first and second C-channels including connection members extending from the first and second C-channels, wherein the connection members are operably coupled with the first and second sidewalls to align the first and second C-channels with the first and second sidewalls, respectively;
the cross-member positioned beneath the seating assembly, such that the cross-member receives loading forces during a collision event;
the first and second tracks fixedly coupled with the first and second C-channels; and/or
the seating assembly rotatable between a forward position and a rearward position.

According to another aspect of the present disclosure, a seating assembly may be provided that includes a seatback pivotally coupled with a seat base. A frame is positioned beneath the seat base. The frame includes an attachment feature extending away from the frame. The seat base is coupled with the frame through the attachment aperture. A cross-member is coupled to the frame. A track assembly includes a pair of guides positioned on first and second sides of the seating assembly. A plurality of tracks is disposed within the guides and coupled to the frame. Each of the guides form an elongated channel to receive the respective track. An electrical assembly is positioned within the channel and is configured to control movement of the tracks within the guides.

Embodiments of this aspect of the disclosure may include any one or a combination of the following features:
the pair of guides positioned within a floor panel of a vehicle;
the cross-member including a first portion and a second portion, wherein the second portion is extendable from the first portion;
the first portion including a plurality of receiving wells and the second portion including a plurality of stops, and the plurality of stops is positioned within the plurality of receiving wells when the second portion is in an extended position; and/or
the plurality of tracks are coupled with the frame such that the frame is positioned between the pair of guides.

According to another aspect of the present disclosure, a vehicle seating assembly may be provided that includes a platform. The platform includes a frame having an attachment feature. A seat base is coupled with the attachment feature. A cross-member is coupled to the frame and movable between extended and retracted positions. The seating assembly also includes a track assembly including a plurality of tracks received by guides. The platform extends between each of the plurality of tracks.

Embodiments of this aspect of the disclosure may include any one or a combination of the following features:
each of the guides having a top wall, a bottom wall, and an outer wall, wherein the top wall and bottom wall are substantially parallel;
each of the guides further including an inner wall joining the top and bottom walls, the inner wall defining an opening;
the tracks operably coupled by the cross-member, wherein each track is positioned within one of the guides such that the cross-member extends through the opening of the guide;
electrical leads positioned within the guide, wherein electrical circuits extend through the opening;
the cross-member having a cross-section configured to distribute a load from the side of the seating assembly;
the seat base including a connection member that is receivable by the attachment feature, the seat base having a width;
the cross-member having a retracted length when the cross-member is in the retracted position, wherein the width of the seat base is substantially equal to the retracted length;
the cross-member having an extended length when the cross-member is in the extended position, wherein the width of the seat base is substantially equal to the extended length; and/or
the connection member being one of a rotating plate and a pitching mechanism.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
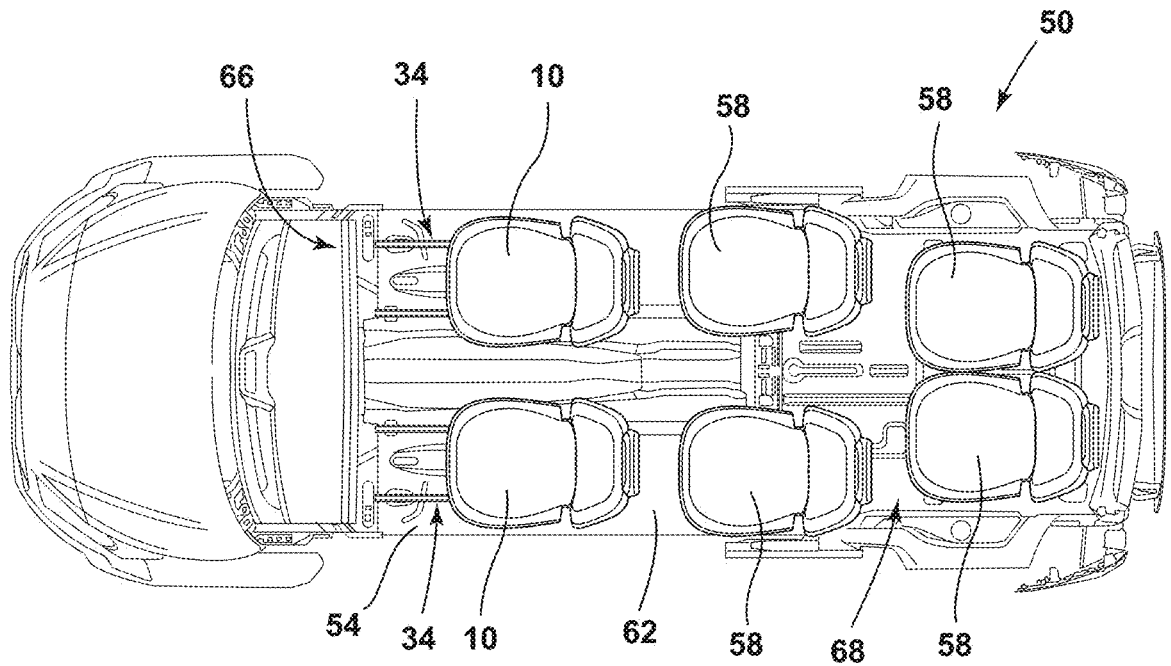
FIG. 1 is a top profile view of a portion of a vehicle having a plurality of vehicle seating assemblies in a first configuration, according to various examples.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a vehicle seating assembly having various features for providing movability of the vehicle seating assembly. The vehicle seating assembly may include a track assembly for translating the vehicle seating assembly fore and aft within the vehicle. The track assembly may be a long track assembly or a short track assembly for full or partial movement of the seating assembly within the vehicle, respectively. The seating assembly may further include a platform extending between tracks of the track assembly. The platform and the track assembly may be integrated into the vehicle underbody frame to provide structural stiffness and side-impact performance. The platform includes cross-members configured to allow the structural stiffness needed for side-impact performance to move with the seating assembly, allowing the seating assembly to be moved into various positions while maintaining structural support. Further, the seating assembly may also include a universal attachment system to allow various seating configurations to couple with the platform including, for examples, rotating seating assemblies. The seating assembly may also include extendable, or widening, cross-members that may allow the platform to be sized for different wide line options based on the seating assembly configuration.

Referring now to FIGS. 1-9B, reference number 10 generally designates a movable vehicle seating assembly. The vehicle seating assembly 10 may include a platform 14. The platform 14 may include a frame 18. The frame 18 may have an attachment feature 22. A seat base 26 may be coupled with the attachment feature 22. A cross-member 30 may be coupled to the frame 18. The cross-member 30 may be movable between extended and retracted positions. The seating assembly 10 may also include a track assembly 34 including a plurality of tracks 38. The plurality of tracks 38 may be received by guides 42. The platform 14 may extend between each of the plurality of tracks 38.

Figure 2:
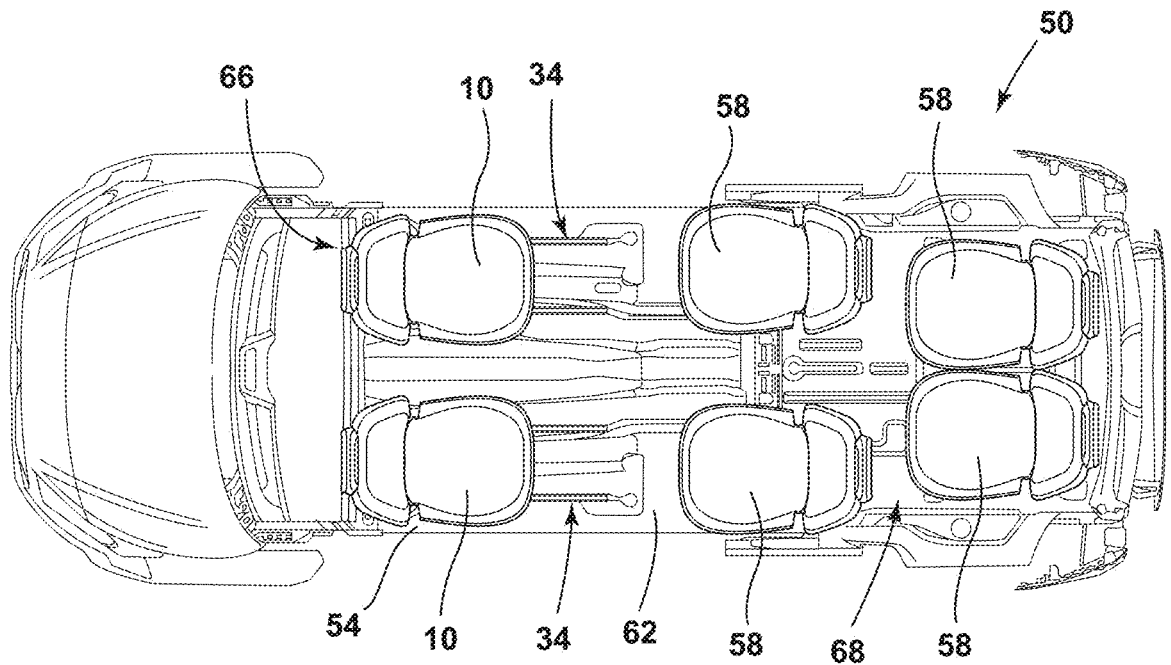
FIG. 2 is a top profile view of a portion of a vehicle having a plurality of vehicle seating assemblies in a second configuration, according to various examples.

Referring now to FIGS. 1 and 2, a base frame 54 of a vehicle 50 is shown having a plurality of seating assemblies 58. The base frame 54 may include a floor panel 62 configured to support the plurality of seating assemblies 58. The base frame 54 may further include a front portion 66 and a rear portion 68. One or more of the plurality of seating assemblies 58 may be configured as the movable vehicle seating assembly 10. It is contemplated that the vehicle 50 may be any type of vehicle, such as a car, a truck, a van, etc. It is also contemplated that the concept set forth in this disclosure may be utilized in the front portion 66 of the vehicle 50 as well as the rear portion 68 of the vehicle 50, depending on the configuration of the vehicle 50.

Figure 7A:
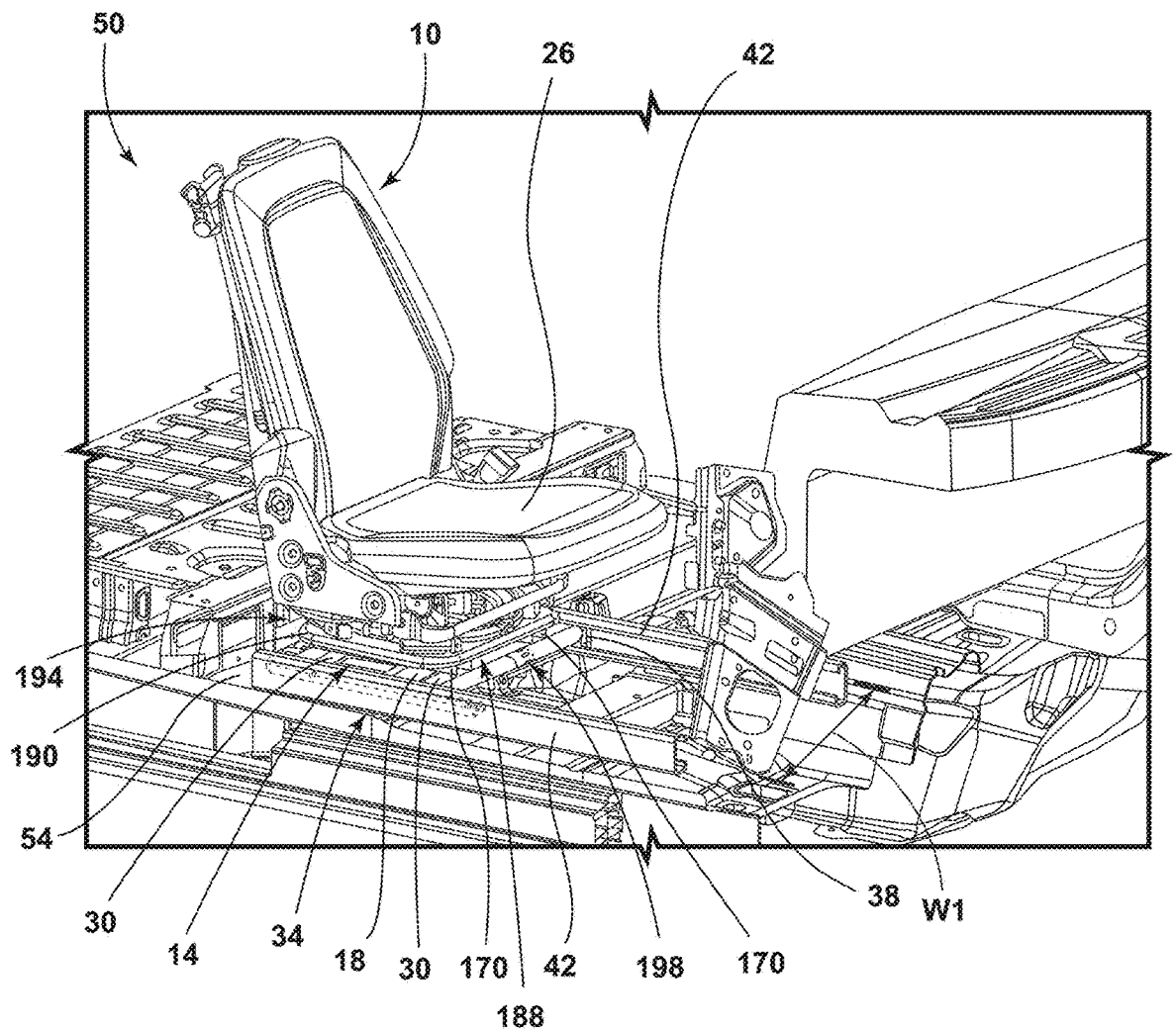
FIG. 7A is a side perspective view of a vehicle seating assembly coupled with a track assembly with the track assembly in a first position, according to various examples.

A portion of the plurality of seating assemblies 58 of FIGS. 1 and 2 is shown positioned within the front portion 66 of the vehicle 50 with one or more of the plurality of seating assemblies 58 being configured as a movable vehicle seating assembly 10. Another portion of the plurality of seating assemblies 58 may be positioned elsewhere within the vehicle 50. The plurality of seating assemblies 58 are operably coupled to the floor panel 62 of the vehicle 50 by track assemblies 34. Any one of the plurality of seating assemblies 58 may be configured as a movable vehicle seating assembly 10. The vehicle seating assemblies 10 may be translatable along the respective track assembly 34 between a first position (FIG. 1) and a second position (FIG. 2). Additionally, the vehicle seating assemblies 10 may be rotatable relative to the platform 14 using a swivel assembly 194 (FIG. 7A). Where the vehicle seating assemblies 10 are rotatable, the vehicle seating assemblies may further be movable between a forward facing position (FIG. 1) and a rearward facing position (FIG. 2).

Figure 3:
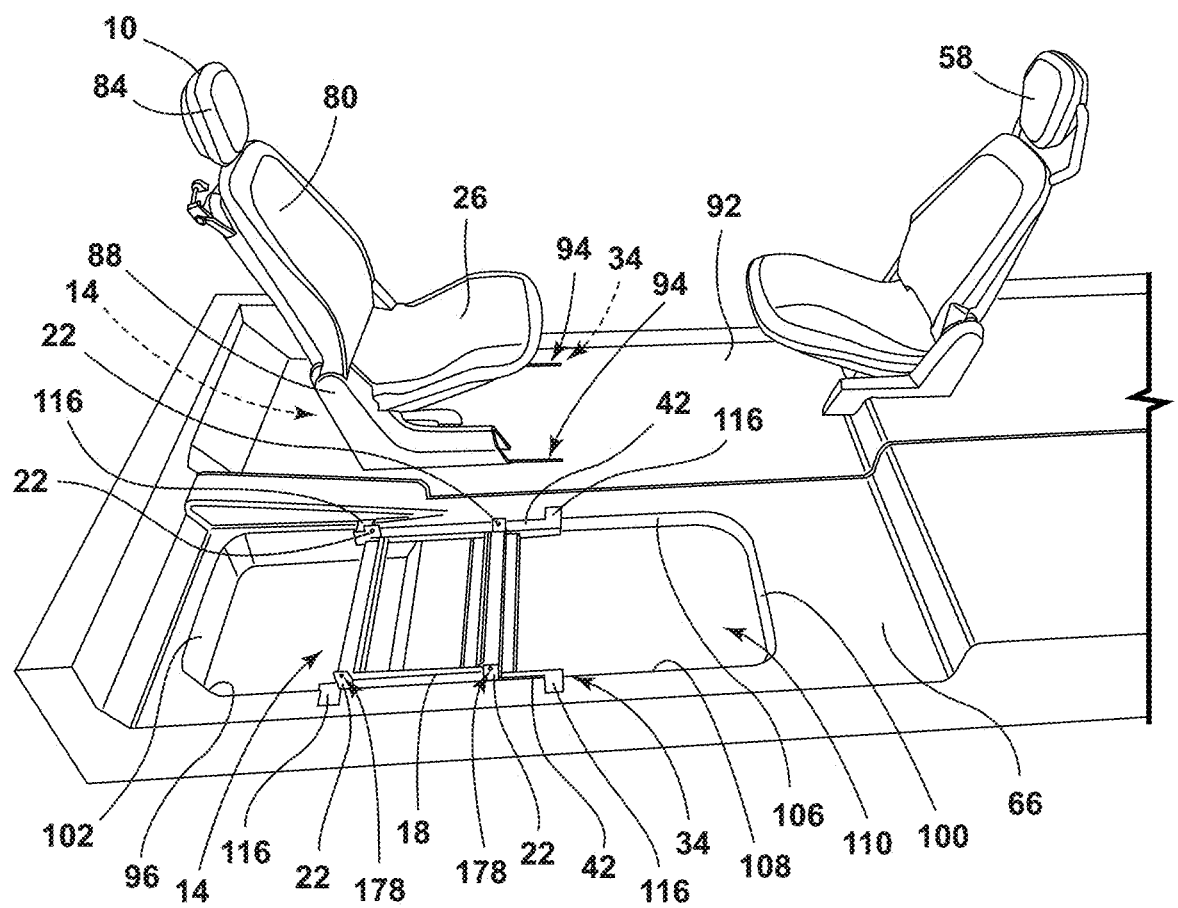
FIG. 3 is a side perspective view of a floor of a vehicle including a plurality of vehicle seating assemblies and a track assembly, according to various examples.
Figure 5A:
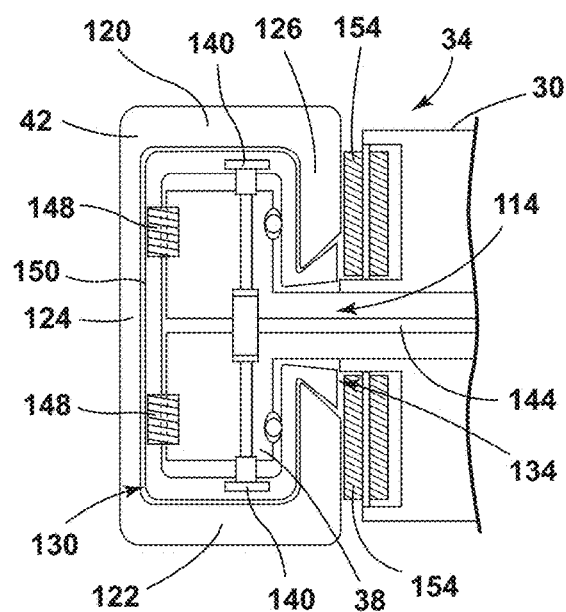
FIG. 5A is a cross-sectional profile view of the track assembly with an electrical assembly taken along line V-V of FIG. 4, according to various examples.

Referring now to FIG. 3, the seating assembly 10 includes a seatback 80 and the seat base 26. The seatback 80 may be pivotally coupled to the seat base 26. A headrest 84 may be coupled to the seatback 80. The seat base 26 may be operably coupled with the platform 14. According to various examples, the seating assembly 10 may include covers 88 positioned on either side of the seating assembly 10 and configured to conceal the platform 14. In other examples, the platform 14 may be positioned beneath the seating assembly 10 (FIG. 5A).

A floor cover 92 may be positioned above and parallel to the floor panel 62 and may be configured to conceal the track assembly 34. The floor cover 92 may define a plurality of slots 94. The plurality of slots 94 may be defined over the tracks 38 of the track assembly 34, such that the platform 14 may extend at least partially through the plurality of slots 94 to couple to the track assembly 34. Each of the plurality of slots 94 may be defined to have a length selected to allow movement of the seating assembly 10 between the first position and the second position.

The floor cover 92 may further conceal a cutout 96 of the floor panel 62. The cutout 96 may be configured to house the track assembly 34. The cutout 96 may include front and rear walls 100, 102 and sidewalls 106, 108. The sidewalls 106, 108 may be spaced apart and may frame a void 110 of the cutout 96. The track assembly 34 may be positioned within the void 110. In various examples, the platform 14 may at least partially be positioned within the void 110 and the track assembly 34. The track assembly 34 may include guides 42 positioned on first and second sides of the seating assembly 10 and operably coupled with the cutout 96. The guides 42 may be positioned in pairs. Each guide 42 may be operably coupled with one of the sidewalls 106, 108, such that the track assembly 34 is recessed within the cutout 96, as the seating assembly 10 is translated between the first and second positions.

Figure 4:
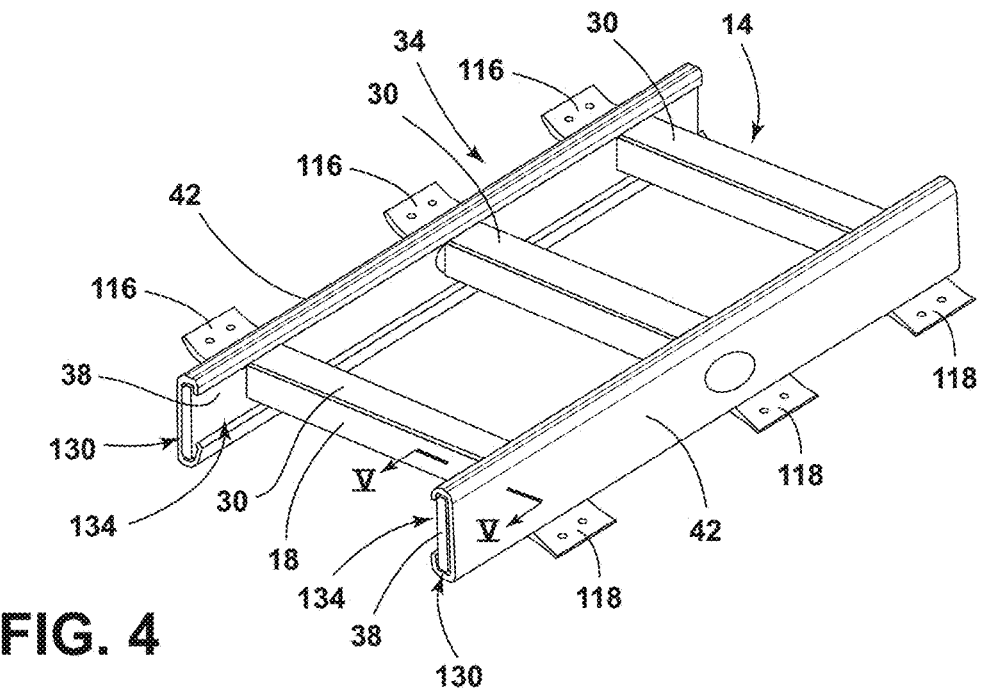
FIG. 4 is a side profile view of a track assembly, according to various examples.

Referring now to FIG. 4, the track assembly 34 is shown removed from the floor panel 62. The track assembly 34 includes the tracks 38 coupled with the guides 42. In other words, the tracks 38 may be disposed within the guides 42 and coupled to the frame 18. According to various examples, the platform 14 may extend between the tracks 38. In other examples, the tracks 38 may be integrally formed with the platform 14, such that the frame 18 of the platform 14 includes the tracks 38. Where the frame 18 includes the tracks 38, the cross-members 30 may be operably coupled at each end to one of the tracks 38, such that each cross-member 30 extends between the tracks 38 and the guides 42. In other words, extendable cross-members 30 may be at least partially supported by the frame 18. Each of the cross-members 30 may be a static cross-member. Alternatively, each of the cross-members 30 may be expandable, as discussed in further detail elsewhere herein.

Each of the guides 42 may include one or more upper connection members 116 configured to extend outward from a top of the guide 42. According to various examples, the upper connection member 116 may be oriented perpendicular to the guide 42. In other examples, the upper connection member 116 may extend outward from the guide 42 at an incline upward from the guide 42. Each of the guides 42 may further include one or more lower connection members 118 configured to extend outward from the bottom of the guide 42. According to various examples, the lower connection member 118 may be oriented perpendicular to the guide 42. In other examples, the lower connection member 118 may extend outward from the guide 42 at an incline downward from the guide 42. Each guide 42 may include any number of upper connection members 116 and/or lower connection members 118. The upper connection members 116 and the lower connection members 118 may be configured to couple each guide 42 to one of the sidewalls 106, 108 of the cutout 96 or another portion of the frame 54 of the vehicle 50 (FIG. 3). In various examples, the guides 42 may be aligned with the first and second sidewalls 106, 108 of the cutout 96. The upper and lower connection members 116, 118 may be configured to couple the guides 42 with the first and second sidewalls 106, 108. In other words, the connection members 116, 118 may be operably coupled with the first and second sidewalls 106, 108 to align first and second guides 42, or C-channels, with the first and second sidewalls 106, 108, respectively Referring now to FIGS. 4-5B, each guide 42 may be a C-channel having a top wall 120 and a bottom wall 122 coupled by an outer wall 124. An inner wall 126 may be spaced apart from the outer wall 124 by the top and bottom walls 120, 122. The walls 120, 122, 124, 126 of the guide 42 may define a channel 130 extending through the guide 42. The inner wall 126 may also define an opening 134 in communication with the channel 130 defined by the guide 42, such that the tracks 38 of the platform 14 may be received within the respective guides 42, as described elsewhere herein. In other words, the guide 42 may define an elongated channel 130 to receive the respective track 38.

Figure 5B:
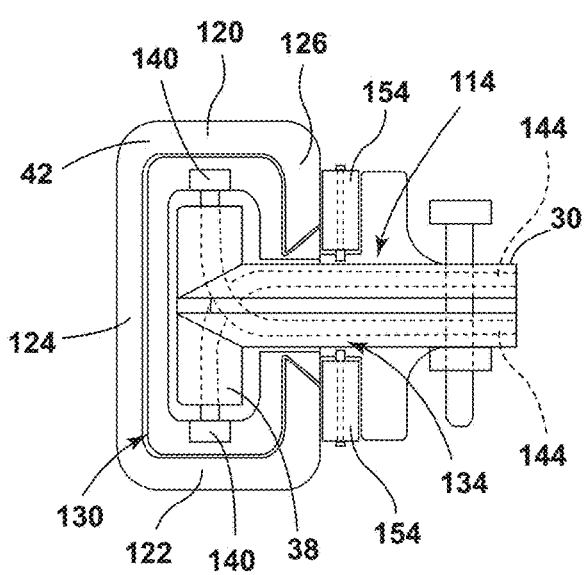
FIG. 5B is a cross-sectional profile view of the track assembly with an electrical assembly taken along line V-V of FIG. 4, according to various examples.

As shown in FIGS. 5A and 5B, the track assembly 34 may include tracks 38 having various configurations. Each track 38 is received within the guide 42 and coupled with the guide 42, such that the track 38 is movable fore and aft along the guide 42. The cross-members 30 may be configured to be positioned at least partially through the opening 134. The track assembly 34 may be manually or electrically powered without departing from the scope of the present disclosure. Where the track assembly 34 is electrically powered, the cross-members 30 may be configured to act as guides for an electrical assembly 114, as discussed elsewhere herein. It is also contemplated that the track assembly 34 may be provided for support and may be a static track assembly 34. Where the track assembly 34 is a static track assembly, the tracks 38 may be fixedly coupled with the guides 42.

Referring again to FIG. 5A, the track assembly 34 is shown having a first exemplary configuration. The electrical assembly 114 may be positioned within the channel 130 of the guide and may be configured to control movement of the tracks 38 within the respective guide 42, or C-channel. The electrical assembly 114 may include a plurality of electrical leads 140. The electrical leads 140 may be enclosed within the guide 42 when the track 38 is received by the channel 130. The electrical leads 140 may be electrically coupled with a control and power system through a connector circuit 144. According to various examples, the connector circuit 144 and/or other electrical components may extend through the cross-member 30. In other examples, the connector circuit 144 and/or other electrical components may extend proximate the cross-member 30. In still other examples, the connector circuit 144 and/or other electrical components may be coupled with the cross-member 30.

The track 38 may further include a first plurality of rollers 148 positioned on an outer edge 150 of the track assembly 34. The first plurality of rollers 148 may be positioned flush with the outer wall 124 of the guide 42. A second plurality of rollers 154 may be positioned on the cross-member 30. The second plurality of rollers 154 may be positioned flush with the inner wall 126 of the guide 42. The first plurality of rollers 148 and the second plurality of rollers 154 may be configured to facilitate sliding movement of the track 38 relative to the guide 42. One or more of the first and second plurality of rollers 148, 154 may be passive rollers. Further, one or more of the first and second plurality of rollers 148, 154 may be dynamic rollers.

Referring again to FIG. 5B, the track assembly 34 is shown having a second exemplary configuration. The electrical assembly 114 may be positioned within the channel 130 of the guide and may be configured to control movement of the tracks 38 within the respective guide 42, or C-channel. The electrical assembly 114 may include the plurality of electrical leads 140 enclosed within the guide 42 when the track 38 is received by the channel 130. The electrical leads 140 may be electrically coupled with the control and power system through one or more connector circuits 144. The connector circuits 144 and/or other electrical components may extend through the cross-member 30, according to various examples. In other examples, the connector circuits 144 and/or other electrical components may extend proximate the cross-member 30. In still other examples, the connector circuits 144 and/or other electrical components may be coupled with the cross-member 30.

According to the second exemplary configuration, the track 38 may further include only the second plurality of rollers 154 positioned on the cross-member 30. The second plurality of rollers 154 may be positioned flush with the inner wall 126 of the guide 42. The second plurality of rollers 154 may be configured to facilitate sliding movement of the track 38 relative to the guide 42. The second plurality of rollers 154 may be passive or dynamic rollers. It will be understood that the illustrations of FIGS. 5A and 5B illustrate exemplary configurations for the track assembly 34 only. It is contemplated that other configurations for electrically powering the track assembly 34 may be used without departing from the scope of the present disclosure.

Figure 6A:
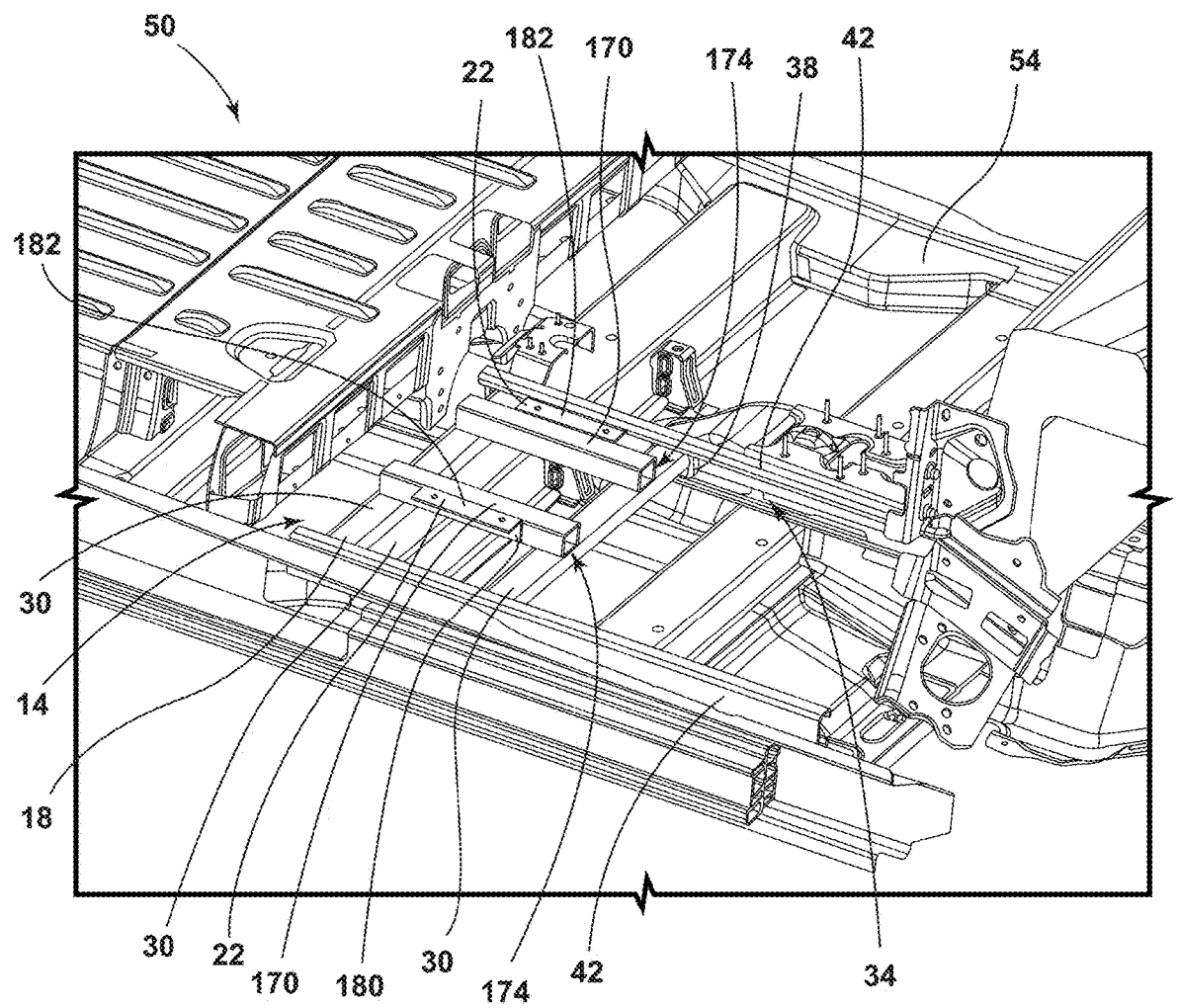
FIG. 6A is a top perspective view of a track assembly coupled with a floor of a vehicle, according to various examples.
Figure 6B:
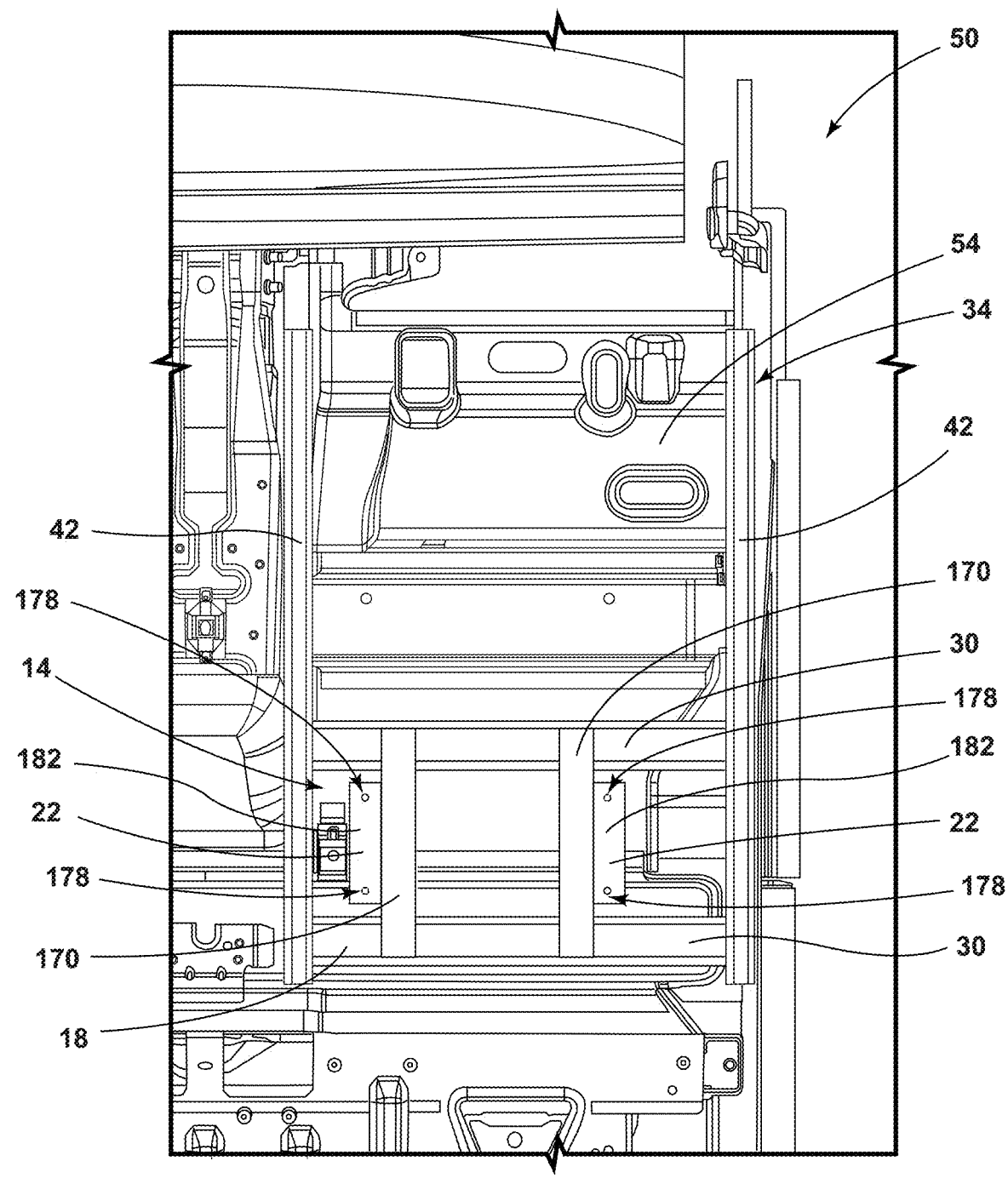
FIG. 6B is a top profile view of the track assembly of FIG. 6A.

Referring now to FIGS. 6A and 6B, the platform 14 is shown operably coupled to the track assembly 34. The frame 18 of the platform 14 may include the tracks 38 spaced apart by at least one cross-member 30. In various examples, support bars 170 may be coupled with the cross-members 30. The support bars 170 may be oriented parallel with the tracks 38 and perpendicular to the cross-members 30. Each of the support bars 170 may extend upward from the cross-members 30. In various examples, each of the support bars 170 may define a channel 174 extending from a first end of the support bar 170 to a second end of the support bar 170. In other examples, each support bar 170 may be a solid bar. The support bars 170 may have a cross-section that is substantially T-shaped, I-shaped, C-shaped, square, rectangular, circular, oblong, or shaped as any other higher order polygon.

As shown in FIGS. 6A and 6B, the attachment features 22 may be operably coupled with the support bars 170. Where the attachment features 22 are coupled with the support bars 170, each attachment feature 22 may be generally L-shaped with a first wing 180 and a second wing 182. The second wing 182 may be positioned perpendicular to the first wing 180. Each attachment feature 22 may be coupled to an outer wall of the respective support bar 170, such that the first wing 180 is substantially flush with the outer wall and the second wing 182 is aligned with a top wall of the respective support bar 170. The second wing 182 extends outward from the respective support bar 170 away from the channel 174. Each second wing 182 may further define apertures 178 configured to receive fasteners to couple the seating assembly 10 to the platform 14 (see FIG. 3).

Alternatively, as shown in FIG. 3, the attachment features 22 may be coupled with the cross-member 30. Where the attachment features 22 are coupled with the cross-member 30, the attachment features 22 may extend upward and away from the platform 14 and frame 18. The attachment features 22 may further include the apertures 178 configured to receive fasteners to couple the seating assembly 10 to the platform 14. It is contemplated that any fastener may be received by the apertures 178 of the attachment features 22 to couple the seating assembly 10 with the platform 14. It is also contemplated that the seating assembly 10 may be coupled with the attachment features 22 using other connections, such as, for example, welding.

Figure 7B:
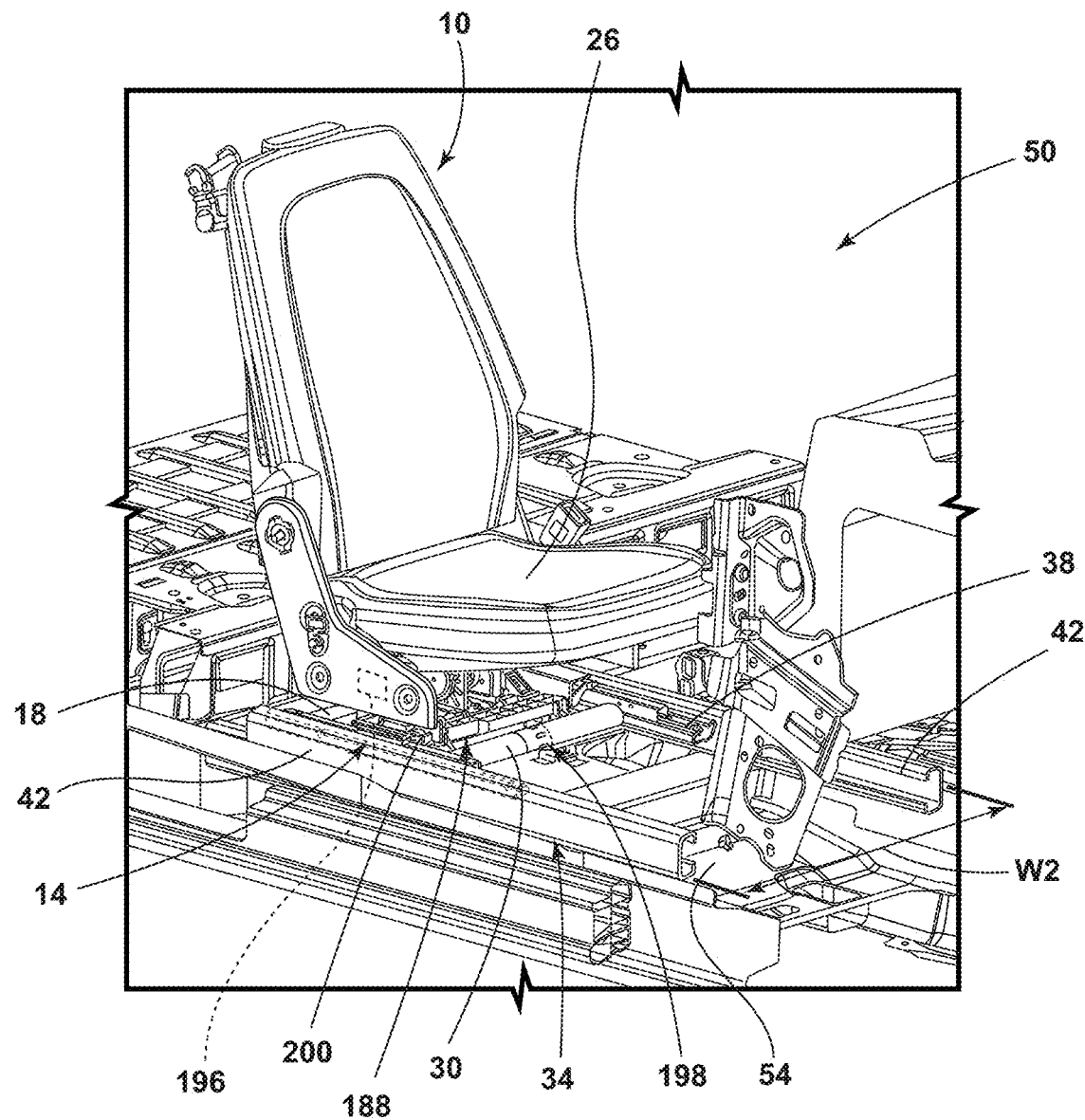
FIG. 7B is a side perspective view of the vehicle seating assembly coupled with the track assembly of FIG. 7A with the track assembly in a second position.

Referring now to FIGS. 7A and 7B, the platform 14 may be configured to support various seating assemblies 10 including rotatable seating assemblies (FIG. 7A) and static seating assemblies (FIG. 7B). The frame 18 of the platform 14 may further include flexible architecture for use with various track assemblies 34.

As shown in FIG. 7A, the platform 14 may include the frame 18 spanning the track assembly 34. The guides 42 of the track assembly 34 may be spaced apart by a first width W1. The tracks 38 may be positioned within the respective guides 42, such that the seating assembly 10 is translatable along the track assembly 34, as discussed elsewhere herein. Each of the cross-members 30 may be extendable to span the first width W1 and may be coupled to each of the tracks 38. As shown in FIG. 7B, the guides 42 of the track assembly 34 may be spaced apart by a second width W2. The tracks 38 may be positioned within the respective guides 42. Each cross-member 30 may be extended, such that the cross-member spans the second width W2 and may be coupled to each of the tracks 38. Each cross-member 30 may include extension connections 198 configured to allow any width adjustments needed to utilize the platform 14 in various seating applications.

According to various examples, as shown in FIG. 7A, the support bars 170 may be coupled with static portions of the cross-member 30, such that the expansion or retraction of extension connections 198 of the cross-member 30 is not affected by the support bars 170. Alternatively, the cross-member 30 may be positioned between the tracks 38, such that the width of the cross-member 30 is determined prior to coupling the support bars 170 with the frame 18 of the platform 14. The support bars 170 may be coupled with a plate 190 and/or swivel assembly 194 configured to operably couple the seating assembly 10 with the frame 18 of the platform 14. In other examples, as shown in FIG. 7B, the seating assembly 10 may be coupled with the cross-members 30 of the frame 18 of the platform 14. A base support 200 may extend between the cross-members 30 and may be configured to support the seating assembly 10. The base support 200 may be positioned to be coupled with the static portions of the cross-member 30, such that the expansion or retraction of the extension connections 198 of the cross-member 30 is not affected by the support bars 170. Alternatively, the cross-member 30 may be positioned between the tracks 38, such that the width of the cross-member 30 is determined prior to coupling the seating assembly 10 with the frame 18 of the platform 14. It will be understood that the illustrated seating assemblies 10 are exemplary only and that any vehicle seating assembly 10 may be coupled with the platform 14. In various examples, the seat base 26 includes a connection member 188 that is receivable by the attachment feature 22. The seat base 26 may have a width W1, W2. The connection member 188 may be the swivel plate 194 or the plate 190 to support a pitching mechanism 196.

Figure 8A:
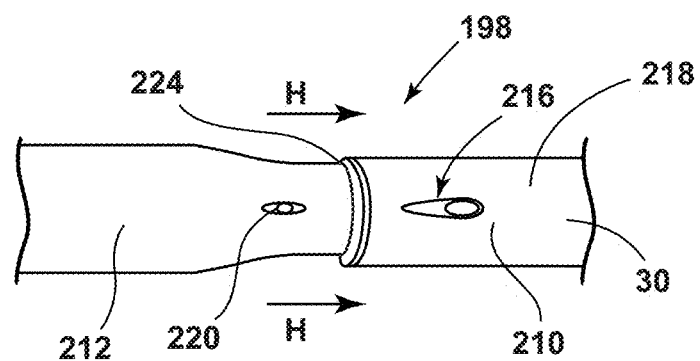
FIG. 8A is a side perspective view of a cross-member of a track assembly in a first position, according to various examples.
Figure 8B:
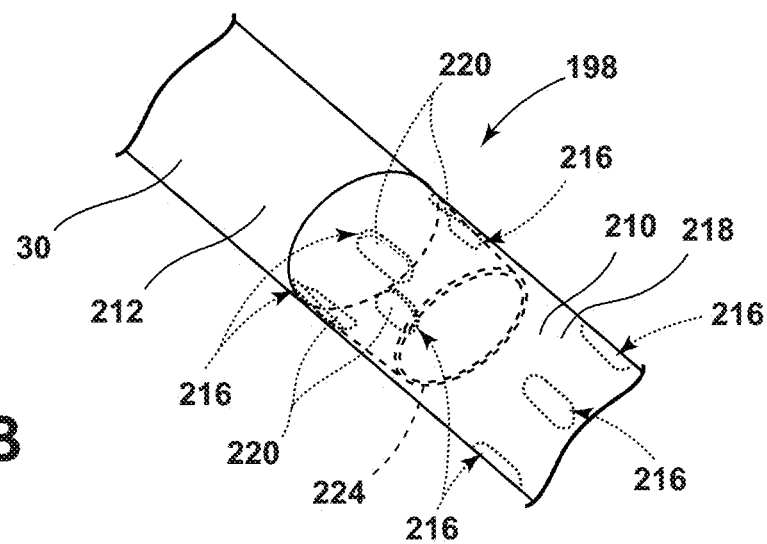
FIG. 8B is a side perspective view of a cross-member of a track assembly in a second position, according to various examples.
Figure 8C:
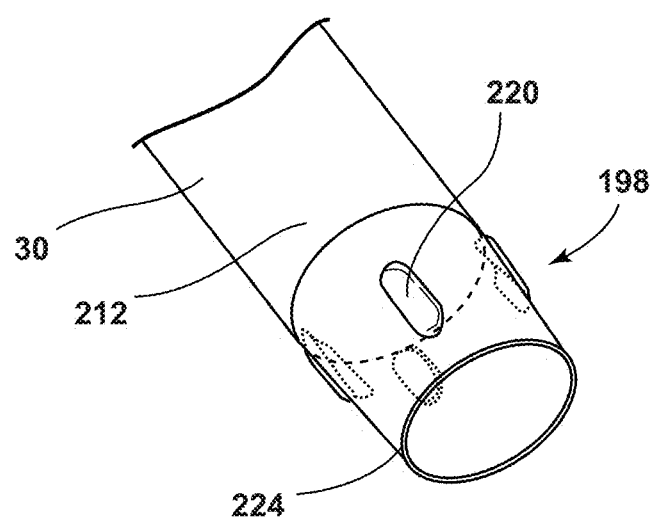
FIG. 8C is a side perspective view of a first portion of the cross-member of FIG. 9B.

Referring now to FIGS. 8A-8C, the extension connections 198 of the cross-members 30 are shown. The extension connections 198 may be positioned on ends of an outer portion 210 and an inner portion 212 of each cross-member 30 to provide extendable cross-members 30 that may accommodate multiple widths for the track assembly 34. The inner portion 212 may be slidably engaged with the outer portion 210, such that the inner portion 212 may be received within the outer portion 210. The inner portion 212 may be movable relative to the outer portion 210 as shown by arrow H in FIG. 8A.

The outer portion 210 of each cross-member 30 may have a plurality of receiving wells 216 defined on an outer wall 218 of the outer portion 210. The plurality of receiving wells 216 may be positioned proximate a first end of the outer portion 210 of the cross-member 30. The plurality of receiving wells 216 may be spaced circumferentially about the outer portion 210. Each of the plurality of receiving wells 216 may be shaped to complement a respective stop 220. Each cross-member 30 may define multiple rows of the plurality of receiving wells 216 to provide various lengths for the cross-member 30, as shown in FIG. 8B.

Each of the plurality of receiving wells 216 is configured to correspond with one of a plurality of stops 220. The plurality of stops 220 may be positioned proximate a first end 224 of the inner portion 212 of cross-member 30. In various examples, the first end 224 of the inner portion 212 may be tapered, as shown in FIG. 8A. In other examples, the first end 224 may be generally straight. Each of the plurality of stops 220 may extend outward from the inner portion 212 of the cross-member 30. The plurality of stops 220 may be spaced circumferentially about the inner portion 212 and may be arranged to complement the plurality of receiving wells 216. In other examples, the stops 220 may snap-engage with the receiving wells 216. Each of the plurality of stops 220 may be shaped as an oval, according to various examples. In other examples, each stop 220 may be shaped as a circle, square, triangle, rectangle, or any other higher order polygon. According to various examples, the stops 220 may be retractable buttons to allow sliding of the inner portion 212 within the outer portion 210. The retractable buttons may further allow rotation of the inner portion 212 relative to the outer portion 210 when the plurality of stops 220 are not received by the respective receiving wells 216. Each of the plurality of stops 220 is positioned within the respective receiving well when the inner portion 212 is in an extended position.

Figure 9A:
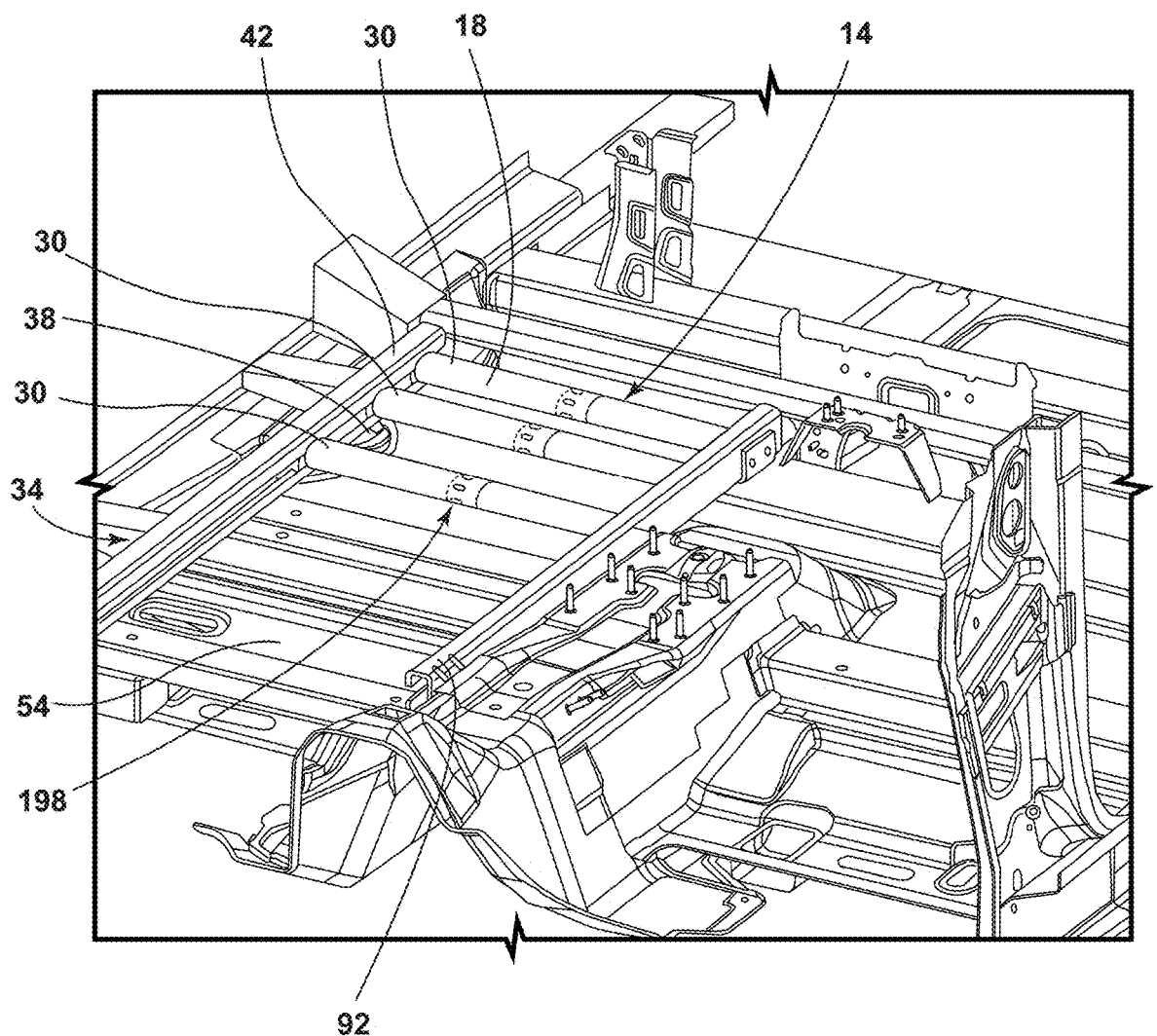
FIG. 9A is a top perspective view of a track assembly coupled with a floor of a vehicle, according to various examples.
Figure 9B:
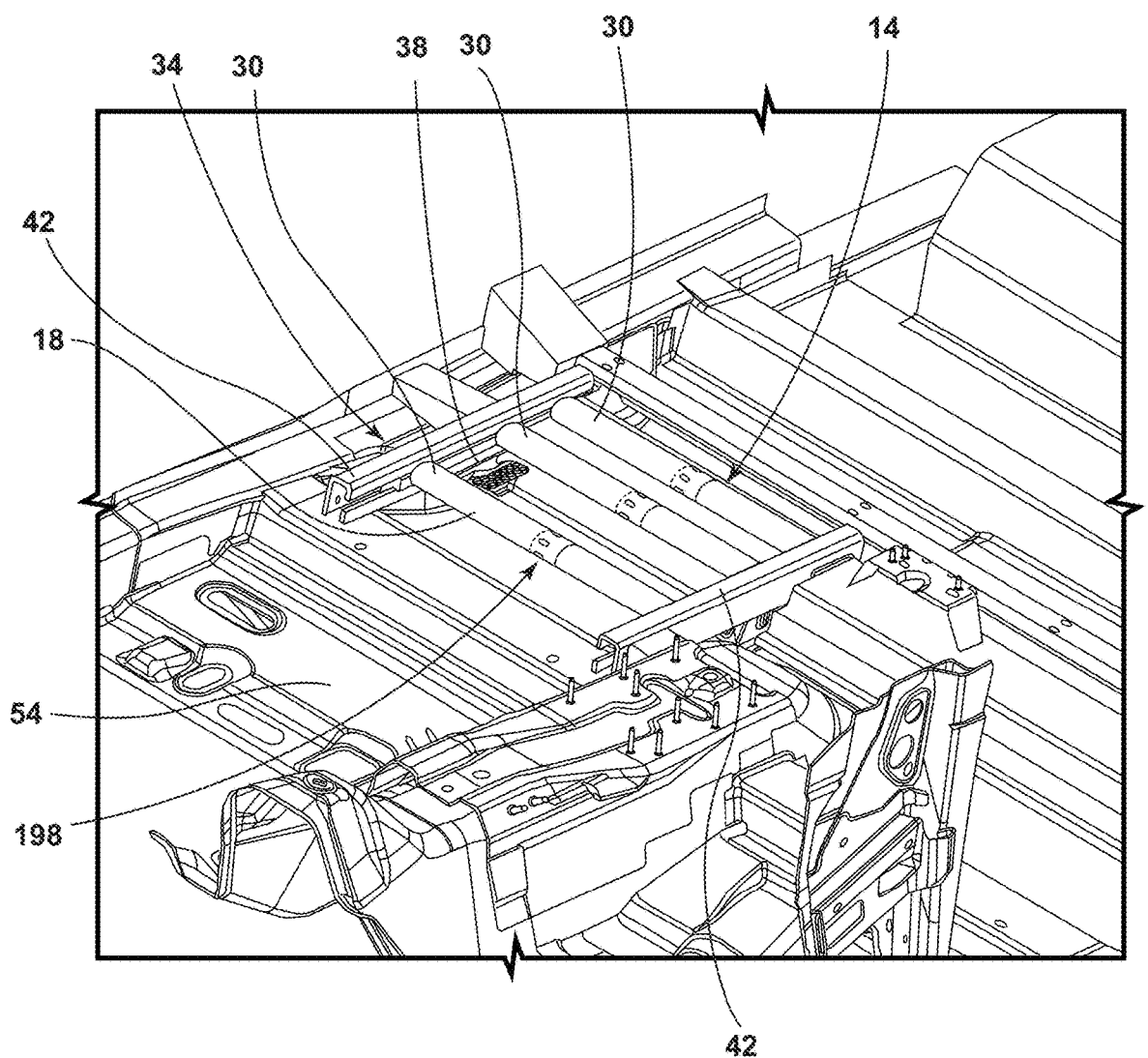
FIG. 9B is a top perspective view of a track assembly coupled with a floor of a vehicle, according to various examples.

Referring now to FIGS. 9A and 9B, the platform 14 may be used with various track assembly 34 lengths. For example, as shown in FIG. 9A, the platform 14 may be used with the track assembly 34 extending to the front of the base frame 54 of the vehicle 50. Similarly, the platform 14 may be used with the track assembly 34 extending only partially along the base frame 54 of the vehicle 50. This variation of service applications allows the platform 14 to be used in configurations that provide additional room for cargo storage.

Referring again to FIGS. 1-9B, the platform 14 and the track assembly 34 provide stabilization and support for various configurations of seating assemblies 10. This allows the seating assemblies 10 and platforms 14 to be used in various applications including, for example, mobility services, storage services, and/or delivery services. The platform 14 may further be configured to provide structural loading and stiffness to enhance the total vehicle underbody system.

The track assembly 34 may be fully powered and electrified or manual to allow full or partial movement of the seating assemblies 10 within the vehicle 50. The flexibility regarding the width of the track assembly 34 and cross-members 30 allows the track assembly 34 to be positioned within the vehicle 50, such that the tracks 38 and the guides 42 are outside of a user's foot-zone. The width of the track assembly 34 provides the benefit of lessening trip hazards and providing more maneuverability of the seating assembly 10 along the track assembly 34.

The track assembly 34 and the platform 14 may further be integrated into the base frame 54 of the vehicle 50, integrating the track assembly 34 with the vehicle underbody system to provide structural stiffness. The platform 14 and the positioning of the track assembly 34, such that the track assembly 34 is integrated with the base frame 54, further may improve side-impact safety performance as the frame 18, including the cross-members 30 and the tracks 38, transfers loading regardless of the positioning of the seating assembly 10. In other words, each cross-member 30 may have a cross-section configured to distribute a load from the side of the seating assembly 10. This positioning of the frame 18 essentially moves the traditional cross-car member supports into the platform 14 of the seating assembly 10. The cross-members 30 of the platform 14 may be positioned beneath the seating assembly 10, such that the cross-members 30 receive loading forces during a collision event. The platform 14 may also perform adaptable seating functions, such as translation of the seating assembly 10 fore and aft along the track assembly 34.

The platform 14 may be configured to be coupled with various seating assemblies 10, such as, for example, rotating seating assemblies, pitching seating assemblies, and static seating assemblies. The universal attachment connections, like the attachment feature 22, may provide flexibility for attachments and seat features to be used with the platform 14. The universal attachment abilities facilitated by the various configurations of the frame 18 of the platform 14 may allow the vehicle seating assembly 10 to be used through any range of travel while still maintaining a continuous, integrated electrical and/or data interface. The platform 14 may also include flexible architecture that may be adjusted to accommodate the various seating assemblies 10. The cross-members 30 of the frame 18 of the platform 14 may be extendable, allowing the platform 14 to be used with seating assemblies 10 and track assemblies 34 having various widths (see FIGS. 7A and 7B). The cross-members 30 may also be configured to mimic the traditional cross-car member supports, as discussed elsewhere herein.

It will be understood by one having ordinary skill in the art that construction of the described concepts, and other components, is not limited to any specific material. Other exemplary embodiments of the concepts disclosed herein may be formed from a wide variety of materials unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly comprising:
   a platform, wherein the platform comprises:
      a frame having an attachment feature, and further wherein a seat base is coupled with the attachment feature; and
      a cross-member coupled to the frame and movable between extended and retracted positions; and
   a track assembly including a plurality of tracks received by guides, wherein the platform extends between the plurality of tracks, and further wherein each track is positioned within one of the guides such that the cross-member extends through an opening of the guide.

2. The vehicle seating assembly of claim 1, wherein each of the guides has a top wall, a bottom wall, and an outer wall, and further wherein the top and bottom walls are substantially parallel.

3. The vehicle seating assembly of claim 2, wherein each of the guides further includes an inner wall joining the top and bottom walls.

4. The vehicle seating assembly of claim 1, wherein the tracks are operably coupled by the cross-member.

5. The vehicle seating assembly of claim 1, wherein electrical leads are positioned within the guide, and further wherein connector circuits extend through the opening.

6. The vehicle seating assembly of claim 1, wherein the cross-member has a cross-section configured to distribute a load from the side of said seating assembly.

7. The vehicle seating assembly of claim 1, wherein the seat base includes a connection member that is receivable by the attachment feature, and further wherein the seat base has a width.

8. The vehicle seating assembly of claim 7, wherein the cross-member has a retracted length when the cross-member is in the retracted position, and further wherein the width of the seat base is substantially equal to the retracted length.

9. The vehicle seating assembly of claim 7, wherein the cross-member has an extended length when the cross-member is in the extended position, and further wherein the width of the seat base is substantially equal to the extended length.

10. The vehicle seating assembly of claim 7, wherein the connection member is one of a swivel plate and a pitching mechanism.

11. A vehicle seating assembly comprising:
    a platform, wherein the platform comprises:
       a frame having an attachment feature, and further wherein a seat base is coupled with the attachment feature, wherein the seat base includes a connection member that is receivable by the attachment feature, and further wherein the seat base has a width; and
       a cross-member coupled to the frame and movable between extended and retracted positions, wherein the cross-member has a retracted length when the cross-member is in the retracted position, and further wherein the width of the seat base is substantially equal to the retracted length of the of the cross-member; and
    a track assembly including a plurality of tracks received by guides, wherein the platform extends between the plurality of tracks.

12. The vehicle seating assembly of claim 11, wherein each of the guides has a top wall, a bottom wall, and an outer wall, and further wherein the top and bottom walls are substantially parallel.

13. The vehicle seating assembly of claim 12, wherein each of the guides further includes an inner wall joining the top and bottom walls, the inner wall defining an opening.

14. The vehicle seating assembly of claim 13, wherein the tracks are operably coupled by the cross-member, and further wherein each track is positioned within one of the guides such that the cross-member extends through the opening of the guide.

15. The vehicle seating assembly of claim 13, wherein electrical leads are positioned within the guide, and further wherein connector circuits extend through the opening.

16. The vehicle seating assembly of claim 11, wherein the cross-member has a cross-section configured to distribute a load from the side of said seating assembly.

17. The vehicle seating assembly of claim 11, wherein the cross-member has an extended length when the cross-member is in the extended position, and further wherein the width of the seat base is substantially equal to the extended length.

18. The vehicle seating assembly of claim 11, wherein the connection member is one of a swivel plate and a pitching mechanism.

\* \* \* \* \*